J. A. TOWNSEND.
INTERBRACED PANTOGRAPH TROLLEY.
APPLICATION FILED JUNE 17, 1913.
1,100,408.
Patented June 16, 1914.
2 SHEETS—SHEET 1.
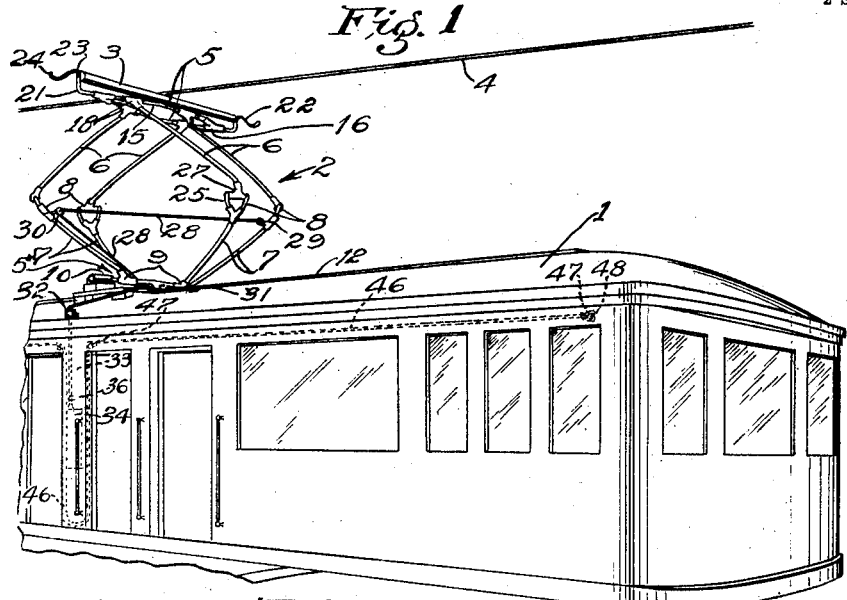
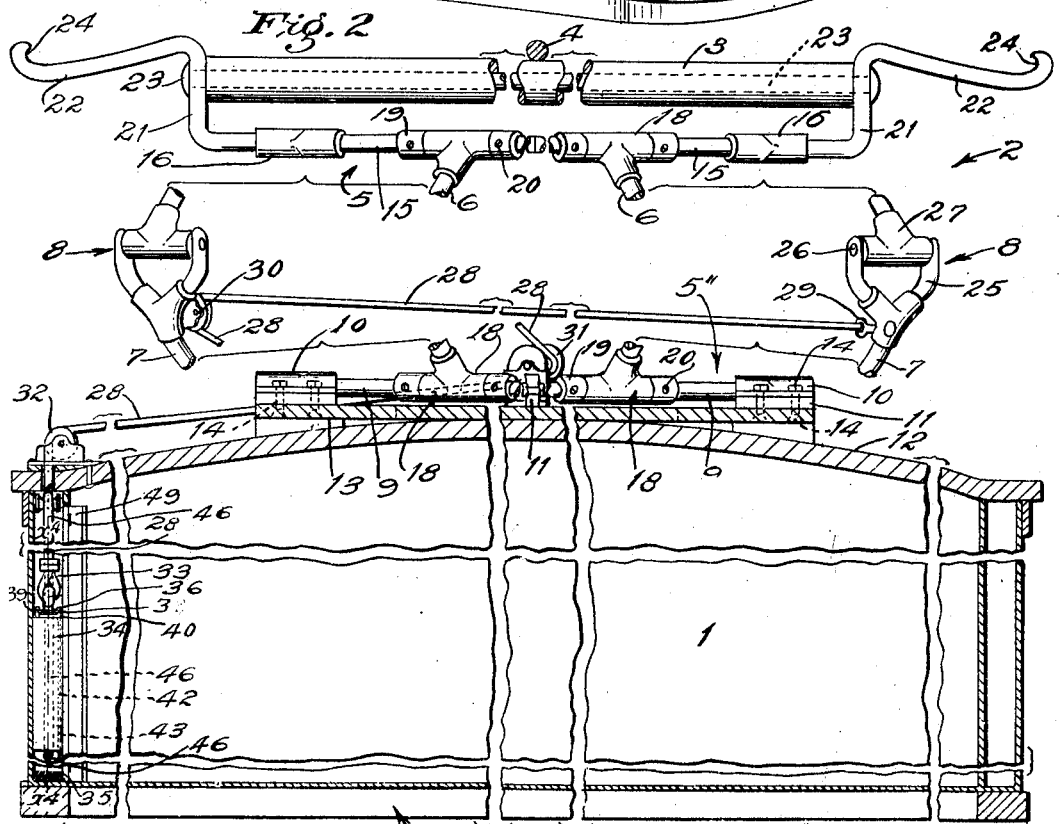
Witnesses
Thor Sjöberg
C. C. Holly
Inventor
Joseph A. Townsend
James R. Townsend
his atty.

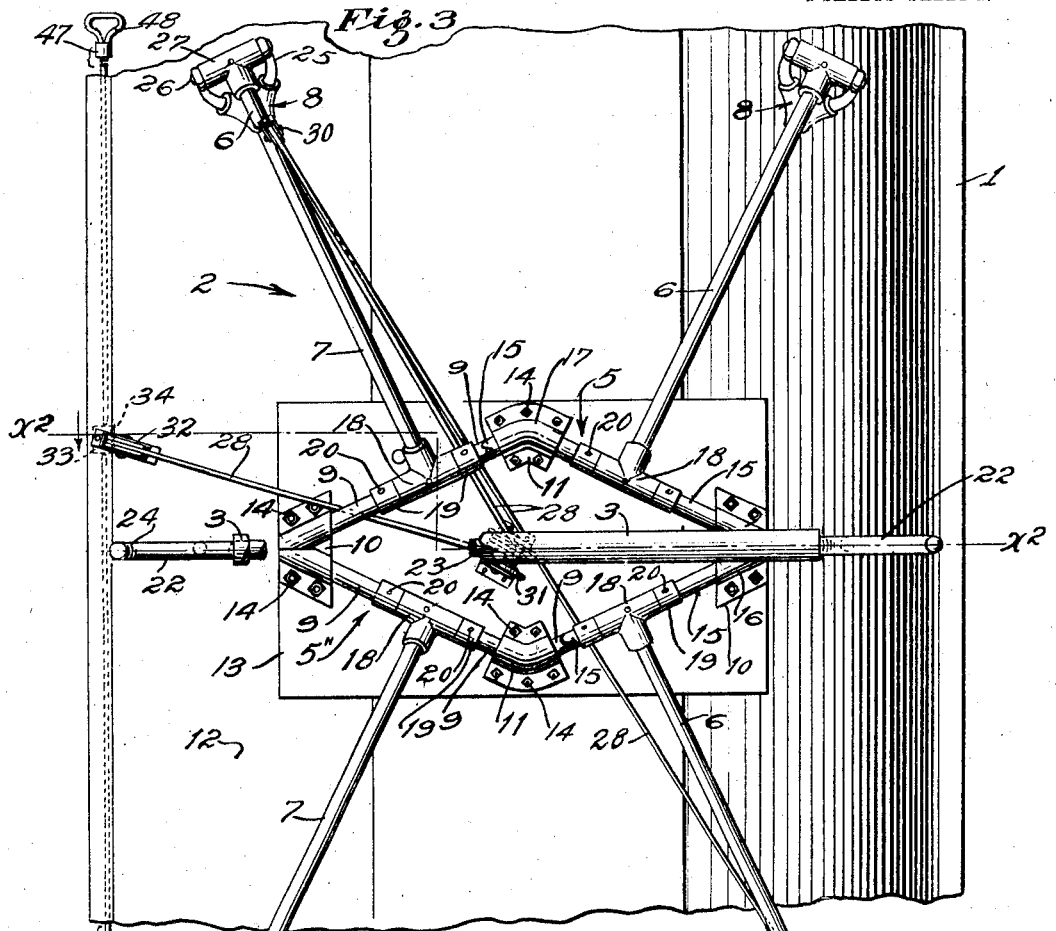

UNITED STATES PATENT OFFICE.

JOSEPH A. TOWNSEND, OF PASADENA, CALIFORNIA.

INTERBRACED PANTOGRAPH-TROLLEY.

1,100,408.  Specification of Letters Patent.  Patented June 16, 1914.

Application filed June 17, 1913. Serial No. 774,264.

*To all whom it may concern:*

Be it known that I, JOSEPH A. TOWNSEND, a citizen of the United States, residing at Pasadena, in the county of Los Angeles and State of California, have invented a new and useful Interbraced Pantograph-Trolley, of which the following is a specification.

This invention relates to that class of electric trolleys wherein a contact device such as a trolley wheel, roller or shoe is supported on an extensible and collapsible skeleton structure, so that the contact device may follow the undulations of the trolley wire.

Objects of this invention are: to provide means whereby the contact device may be caused and allowed to move toward and from the trolley wire only in a path normal to the car body so that the car can be run forward and back without attention to the trolley; to secure maximum stability of the trolley frame and to insure against any careening or overbalancing thereof; to hold the contact device against the trolley wire with a uniform and exactly adjusted pressure so as to avoid unnecessary wearing action on the trolley wire or strain on the same or on its support, and to hold an elongated contact device level.

This invention is especially adapted to carry an elongated trolley wheel, roller or shoe so that the wheel practically never jumps from the trolley wire, and it is characterized by the fact that the extensible and collapsible skeleton structure for supporting the wheel is simple, strong and self-bracing.

Additional characteristics and advantages may appear in the following description or in the drawings filed herewith.

The invention may be variously constructed and is regarded as pioneer in that the extensible and collapsible frame comprises two sets of arms and two terminal frames, one set of arms being pivotally connected to one terminal frame by pivotal axes that are spaced apart and are angularly disposed relative to each other, the other set of arms being pivotally connected to the other terminal frame in a similar manner and said arms being pivotally connected together in pairs; the pivotal axes of each pair of arms being parallel with each other and angularly arranged with relation to the pivotal axes of the other pairs of arms so that one terminal frame can move relative to the other terminal frame only in a right path.

Another pioneer feature of the invention resides in the combination with two of such arms, of a connection fastened to one of the arms led thence over a pulley on another of said arms and thence over a pulley in fixed relation to one of said frames so that by operation of said connection the extensible frame may be extended by drawing upon the connection and said frame may be collapsed by gravity when the connection is relaxed.

This invention includes and may be fully carried out with a pantograph trolley frame of three or more pairs of pivotally connected arms, the axes of each pair of arms being oblique to those of at least two other pairs of arms.

The accompanying drawings illustrate the invention in what is at present deemed the best form in which I contemplate embodying the same.

Figure 1 is a perspective view of a trolley embodying the invention as in use on a middle entrance trolley car, a fragment of which is shown. Fig. 2 is a broken elevation of a trolley mounted on a car shown in transverse sectional elevation from line $x^2$, Fig. 3, parts being displaced and moved toward each other to contract the view. Fig. 3 is a plan view of the invention applied to a car, a portion of which is shown. Parts are broken away for clearness of illustration and to contract the view. Fig. 4 is a fragmental sectional view taken on line $x^4$, Figs. 2, 5 and 6, and shows the counterbalancing weight and retrieving means. Fig. 5 is a fragmental sectional elevation on line $x^5$, Figs. 4 and 6. Fig. 6 is a fragmental plan section on line $x^6$, Figs. 4 and 5.

1 is a car and 2 in a general manner represents a skeleton trolley frame holding a contact device 3 in the form of an elongated trolley roller against the trolley wire 4.

An important feature of the trolley frame will be noted from Fig. 3 where top and bottom angular terminal frames 5, 5″ are shown superposed, the top frame or contact carrier 5 being broken away in part to expose parts of the bottom frame 5″. It is to be noted that these terminal frames are practically alike in that each has a plurality of sides two or more of which are obliquely disposed relative to the mid-line and the sides of the car. To these frames are pivotally connected two sets of arms 6, 7; there being pivotally connected to frame 5 the set of downwardly extending and diverging arms 6, and to frame 5″ a like set of arms 7, which extend and diverge from each other upwardly; the upper ends of the arms 7 being pivotally connected by the joint 8 to the lower ends of the arms 6 and the lower ends of arm 7 being pivotally connected with the top of the car through the medium of the lower frame 5″ which is composed of cylindrical members 9 and acute and obtuse angle boxes 10, 11, holding the members 9; the boxes being fixed to the top 12 of the car through the medium of the platform 13 and the bolts 14 fixed thereto and extending through the boxes which are secured by the nuts of said bolts.

The top frame 5 is formed of four cylindrical side members 15 which may be of gas pipe or other suitable material fastened together by the acute and obtuse angle pipe connections 16, 17.

The pivotal joints at the upper ends of the arms 6 and lower ends of arms 7 are shown as formed of gas pipe T's 18 journaled on the side members 15 and 9, respectively of the top and bottom frames and held in place by thrust collars 19 fixed on the members by set screws 20. The top frame has upwardly projecting side arms 21 that are flared over so as to form the emergency hooks 22 and that carry the elongated pin 23 upon which may be rotably mounted the elongated trolley wheel or roller 3 which contacts normally with the trolley wire 4.

The trolley wheel being sufficiently wide or elongated will practically never jump the wire but if by any circumstance displacement occurs, the emergency hooks 22 may come into service and catch the wire and guide it to the contact device.

The corresponding arms 6, 7, of the upper and lower sets are pivotally connected by any suitable pivotal joint forming means which in the drawings embrace forks 25, 8 pins or pivotal axes 26, and T-shaped bearings 27; the forks and bearings being fixed to the ends of the arms and pivoted together by the pins.

The skeleton trolley frame thus constructed is collapsible and will drop or retrieve vertically toward the roof of the car by force of gravity but by reason of the plural sided terminal frames it holds the contact device constantly true to a vertical line. Various means operated by springs, compressed air, electrical power or by gravity may be variously applied to this novel laterally rigid skeleton structure for extending it upward and for urging the roller against the trolley, but in the drawings I have shown novel gravity-operated means for this purpose. An advantage of the gravity-operated means lies in its simplicity and reliability as compared with the complexity and uncertainty of spring or air-controlled means, and an object of this invention is to apply it in such manner that it will not detract from the collapsible feature and will always be out of the way. The form of the gravity-controlled means which I prefer includes a line, as the cable 28 firmly attached to one arm as at 29, Fig. 2, and strung through the pulley connection 30 on another arm, and thence down and around the pulley 31 fixed to the car—see Figs. 2 and 3—and from thence around the pulley 32 and down into a chamber 33, Fig. 3, where it is ordinarily connected with the counter-balancing weight means 34. It is seen that the line is connected with the base and with two of the pivoted arms and has running connection with the base and at least one of said arms.

The chamber 33 may extend the full height of the car and the weight 34 normally gravitates about mid-way between the top and bottom of this chamber. Acting through the line 28 this weight serves to draw toward each other those arms to which the line is connected as at 29 and 30, thus to elongate the trolley frame to move the contact device, as the trolley wheel 3, upward and to hold it against the wire. The weight 34 is made just heavy enough to extend the trolley frame and hold the contact device constantly against the trolley wire with the required pressure as said device runs along the undulations of the wire 4; the weight 34 correspondingly moving up and down within the chamber 33. If from any cause the contact device escapes from the wire 4, the weight 34 will descend toward the rubber bumper or cushion 35 at the bottom of chamber 33, thus extending the trolley frame so that it might strike and break the cross-arms or span wires used in supporting the trolley wire 4. To avoid such breakage provision is made for releasing the cable 28 from the weight 34 when the weight has descended to a determined point.

The cable 28 is firmly connected to an anchor 36 which has lateral lugs 37, over which are caught retainers in the form of rigid metal straps 38, pivotally connected at one end to the weight 34 by staple members 39, Figs. 5, 6; so that they may pivot upwardly into the dotted position, 38′ Fig. 5, or laterally into the dotted position 38″, Fig. 6, when not held by the catch plate 40, Figs. 4, 5 and 6, which is riveted onto the weight 34 and has notches 41, Fig. 4, into which the straps 38 extend so as to be locked down across the lugs 37, as shown in Fig. 4, thus operatively connecting the cable with the weight. In order to throw the straps sidewise out of the notches 41, as indicated at 38'', Fig. 6, so as to disconnect the anchor 36 and cable 28 from the weight 34, a spear-shaped member 42, somewhat longer than the weight 34 is slidably carried in a groove 43 on one side of the weight and is provided at the top with a wedge point 44 to wedge between the two straps 38 when the lower end 45 of the spear, which projects somewhat below the weight 34, is intercepted as the weight descends. When the trolley wheel is unrestrained, the weight 34 therefore drops until the lower end of the spear-shaped member 43 comes into contact with the bumper 35, whereupon the spear point 34 will stop while the weight will carry the straps down along the wedge 44 which forces the straps out of the notches 41 and allows the weight of the trolley frame to withdraw the anchor from the straps so as to disconnect the line from the weight and allow the trolley frame to collapse toward the roof of the car and come to rest where it will not interfere with the cross wires which support the trolley wire. When the trolley is thus collapsed the line will be drawn out to its full length by the spreading apart of the arms to which it is connected and the anchor 36 will be in the upper portion of chamber 33, while the weight will be on the bottom of the chamber. In order to again connect the weight with the anchor, a resetting connection, as the line 46, is strung under the weight, as shown in Figs. 1, 4 and 5, and is led around pulleys 47 and is provided at the ends with handles 48 convenient to the motorman at either end of the car, so that the weight may be drawn to the top of the chamber 33. A suitable door 49, formed in the casing, gives access to the chamber 33, so that the motorman or conductor may reset the anchor and the straps 38 to reconnect the weight and the cable.

In considering the trolley construction above described, it will, of course, be apparent that it is subject to considerable modification, as by using a different number of arms, and by distributing them in different geometrical relations, and it is understood that such modifications are within the scope of my invention, but I wish to direct attention to the fact that by arranging the joints with relatively oblique pivot axes, the frame is interbraced so it will not careen; and by the diamond-shaped frame shown, having its elongated axis lying transversely of the car,—see Fig. 3—the supporting arms 6 and 7 need not project out beyond the sides of the car in order to secure a proper bracing against any tendency to careen. Also the proper bracing of the elongated trolley wheel 3 having its axis oblique to the axes of the joints is compact and convenient and the car can travel in either direction without changing the trolley.

In practice the weight acts at about the same leverage at all times when the contact device is running along the trolley wire, and therefore, by increasing or decreasing the weight 34, a proper adjustment of the pressure on the wire can be secured. Attention is also directed to the fact that the pivot axes of the joints at 5, 5'' and 8 are in planes parallel with each other and with the axis of the contact device and that the axes of the pivots of each plane are oblique to each other and that this feature of construction insures smooth action and perfect interbracing of the trolley frame so it will not be possible to make the same careen.

I claim:—

1. A pantograph trolley for cars comprising a contact carrier, a base frame adapted for attachment to the car, downwardly diverging arms obliquely pivoted to the carrier on axes that are oblique to each other and upwardly diverging arms pivotally connected to the base on like oblique axes, the upper ends of the oblique upwardly diverging arms being pivotally connected to the lower ends of the oblique downwardly diverging arms; and means for normally urging the oblique arms toward each other so as to normally urge the contact carrier upward.

2. The combination with a car of a plurality of upwardly projecting oblique arms, means obliquely pivoting the lower ends of said arms with the car on axes oblique to each other and to the axis of the car; a contact carrier above said arms, and arms obliquely pivoted to and diverging downwardly from said contact carrier and pivotally connected to the upper ends of the upwardly diverging oblique arms; the axes of the pivots of each pair of oblique arms thus pivotally connected together, being parallel with each other and also being oblique to the axis of the contact carrier and the car; each of said axes being oblique to the axes adjacent thereto.

3. A pantograph trolley frame having its pivotal axes arranged in three planes, the pivotal axes in each plane being arranged in angular relation to each other.

4. A pantograph trolley frame having its pivotal axes arranged in parallel planes, the pivotal axes in each plane being arranged in angular relation to each other.

5. A pantograph trolley frame having its pivotal axes arranged in three planes, the pivotal axes at each plane being oblique to each other.

6. A pantograph trolley frame having its pivotal axes arranged in three parallel planes, the pivotal axes at each plane being oblique to each other.

7. A pantograph trolley frame comprising more than two pairs of pivotally connected arms, and frames pivotally connected with said arms at bottom and top respectively; the axes of the pivots being spaced apart and oblique to each other.

8. A pantograph trolley frame comprising more than two pairs of pivotally connected arms; a base to which the lower arms are pivotally connected; and a trolley carrier to which the upper ends of the upper arms are pivotally connected, the axes of the pivotal connections at any plane being oblique to each other.

9. The combination with a pantograph trolley frame comprising a base and pairs of arms pivotally connected together; of a line having a connection with the base and with two of said arms; such connection with one of said arms being a running connection, and means to operate the line to draw said arms toward each other, thus to extend the trolley frame.

10. The combination with a pantograph trolley frame comprising a base and pairs of arms pivotally connected together; of a line having a connection with the base and with two of said arms; such connection with one of said arms being a running connection, and weight means to operate the line to draw said arms toward each other, thus to extend the trolley frame.

11. The combination with a pantograph trolley frame comprising a base and pairs of arms pivotally connected together; of a line having a connection with the base and with two of said arms; such connection with one of said arms being a running connection, means to operate the line to draw said arms toward each other, thus to extend the trolley frame; and means to disconnect the line from said operating means when the trolley frame has extended to a determined height.

12. The combination with a pantograph trolley frame comprising a base and pairs of arms pivotally connected together; of a line having a connection with the base and with two of said arms; such connection with one of said arms being a running connection, weight means to operate the line to draw said arms toward each other, thus to extend the trolley frame, and means to disconnect the line from said weight means when the trolley frame has been extended to a determined height.

13. The combination with a pantograph trolley frame of a weight, a line connected to extend the frame detachably connected with the weight; means to detach the weight from the line at a point in its descent; and a line having running connection with the weight to lift the same for reattachment to the frame extending line.

In testimony whereof I have hereunto set my hand at Los Angeles, California, this 10th day of June, 1913.

JOSEPH A. TOWNSEND.

In presence of—
JAMES R. TOWNSEND,
L. BELLE WEAVER.

Copies of this patent may be obtained for five cents each, by addressing the "Commissioner of Patents, Washington, D. C."